(12) United States Patent
Yerli et al.

(10) Patent No.: US 11,202,190 B1
(45) Date of Patent: Dec. 14, 2021

(54) BACKUP BATTERY, COMMUNICATIONS DEVICE AND METHOD THEREOF

(71) Applicant: TMRW FOUNDATION IP S. À R.L., Luxembourg (LU)

(72) Inventors: Cevat Yerli, Frankfurt am Main (DE); Liyana Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 17/164,721

(22) Filed: Feb. 1, 2021

(51) Int. Cl.
| | |
|---|---|
| *H04W 4/90* | (2018.01) |
| *H02J 7/00* | (2006.01) |
| *H02J 9/06* | (2006.01) |
| *G01S 19/47* | (2010.01) |
| *H04N 7/18* | (2006.01) |
| *G01S 19/46* | (2010.01) |

(52) U.S. Cl.
CPC ............ *H04W 4/90* (2018.02); *H02J 7/0048* (2020.01); *H02J 7/0068* (2013.01); *H02J 9/06* (2013.01); *G01S 19/46* (2013.01); *G01S 19/47* (2013.01); *H04N 7/183* (2013.01)

(58) Field of Classification Search
CPC ....... H04W 4/90; H02J 7/0048; H02J 7/0068; H02J 7/06; G01S 19/46; G01S 19/47; H04N 7/183
USPC ........................................................ 307/126
See application file for complete search history.

(56) References Cited

U.S. PATENT DOCUMENTS

| | | |
|---|---|---|
| 5,633,573 A | 5/1997 | Van Phuoc et al. |
| 10,271,196 B1 * | 4/2019 | Yanamandra ........... H04W 4/50 |
| 2010/0004035 A1 * | 1/2010 | Ray ........................ H04W 76/50 |
| | | 455/572 |
| 2017/0214263 A1 | 7/2017 | Fathollahi et al. |
| 2017/0237128 A1 * | 8/2017 | Kubo .................... H02J 7/0025 |
| | | 429/7 |
| 2017/0274798 A1 | 9/2017 | Colasacco |
| 2017/0346334 A1 * | 11/2017 | Mergener ................. H02J 9/06 |

(Continued)

FOREIGN PATENT DOCUMENTS

| | | |
|---|---|---|
| DE | 102006033956 A1 | 1/2008 |
| WO | 9615563 A1 | 5/1996 |

OTHER PUBLICATIONS

Nishkam, et al., "Context-aware Battery Management for Mobile Phones", 2008, Conference Paper, DOI:10:1109/PERCOM_2008. 108, 11 pages.

(Continued)

*Primary Examiner* — Jared Fureman
*Assistant Examiner* — Duc M Pham
(74) *Attorney, Agent, or Firm* — Christensen O'Connor Johnson Kindness PLLC (57) ABSTRACT

In some embodiments, a communications device is provided that includes a normal internal energy storage configured to supply energy to the communications device during normal operations, and a backup internal energy storage configured to supply energy to the communications device during emergency operations. The communications device is configured to, in response to detecting that a state of charge of the normal internal energy storage has reached a predetermined level, switch from the normal operations mode to the emergency operations mode and switch from consuming power from the normal internal energy storage to consuming power from the backup internal energy storage.

20 Claims, 6 Drawing Sheets

(56) References Cited

U.S. PATENT DOCUMENTS

2018/0067528 A1* 3/2018 Wang .................... H01M 50/20
2018/0370466 A1* 12/2018 Murata .................... G05B 9/02

OTHER PUBLICATIONS

Gurries, "Battery Manager Enables Integrated, Efficient, scalable and Testable Backup Power Systems", Linear Technology Magazine, 2008, 17-24.

* cited by examiner

BACKUP BATTERY, COMMUNICATIONS DEVICE AND METHOD THEREOF

BACKGROUND

Typically, communications devices such mobile phones are powered by being connected to an energy supply, such as a battery for energy storage. If the energy supply of the battery runs out, the communications device needs to be plugged in to an external power source, or else the device shuts off and all the functions thereof are disabled. On top of this, more modern mobile phones include batteries that are not replaceable, meaning that users cannot exchange the batteries with someone else's to place calls, or cannot carry a separate battery to act as a backup for the devices. If the user does not have a charger available, or a power connection where to plug the charger, or a separate power bank, then the user may remain with limited options in case of a need to communicate with another party, especially in case of an emergency.

Thus, what is desired is a communications device comprising a way to supply the communications device with energy without requiring separate devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

At least some of the drawbacks described in the background are solved by a communications device and a method for providing backup energy to a communications device.

In one aspect, a communications device includes a normal internal energy storage configured to supply energy to the communications device during normal operations, a backup internal energy storage configured to supply energy to the communications device during emergency operations, and at least one processor. The at least one processor is connected to a charging and discharging circuit linked to the normal internal energy storage and the backup internal energy storage. The communications device also includes at least one memory having stored thereon instructions that, in response to execution by the at least one processor, cause the processor to perform actions for at least operating the communications device, controlling the normal internal energy storage through a normal operations mode and for controlling the backup internal energy storage through an emergency operations mode. The actions comprise managing functionality of the communications device and controlling the normal internal energy storage and the backup internal energy storage, controlling the normal internal energy storage through a normal operations mode and controlling the backup internal energy storage through an emergency operations mode, and, in response to detecting that a state of charge of the normal internal energy storage has reached a predetermined level, causing the communications device to switch from the normal operations mode to the emergency operations mode and causing the communications device to switch from consuming power from the normal internal energy storage to consuming power from the backup internal energy storage.

The actions may further comprise, prior to causing the communications device to switch from the normal operations mode to the emergency operations mode, causing the communications device to switch off before an automatic or manual reboot. The actions may further comprise providing an interface for choosing whether the communications device is automatically caused to switch off before switching from the normal operations mode to the emergency operations mode. Said switching from the normal internal energy storage to the backup internal energy storage may be performed by a switch connected to the at least one processor.

The actions may further comprise, during the emergency operations mode, at least one of using at least one transceiver of the communications device to perform emergency call to pre-recorded emergency numbers, sending and receiving text message to the pre-recorded emergency numbers, using one or more cameras of the communications device for capturing and sending photo or video, and obtaining a geolocation of the communications device. The actions may further comprise, during the emergency operations mode obtaining a geolocation of the communications device, and attaching the geolocation to at least one of an emergency call, a text message, a photo, and a video.

The actions may further comprise, during the emergency operations mode, at least one of enabling one or more cameras of the communications device to capture photo and video in a low resolution, enabling using an adjusted or reduced display illumination with reduced battery usage, reducing a refresh rate when displaying images, reducing a frame rate when displaying video, and reducing a number of processor cores being used simultaneously to a minimum functional number.

In some aspects, when charging the communications device, the at least one processor controls the charging and discharging circuit to direct charge from an external power source to firstly charge the backup internal energy storage and then, once the backup internal energy storage is charged, the normal internal energy storage.

In some aspects, at least one of the normal internal energy storage and the backup internal energy storage may be a rechargeable battery, where the rechargeable battery is a lithium-ion polymer battery, a nickel cadmium battery, a nickel metal hydride battery, a lithium-ion battery, a lithium polymer battery, or a lead acid battery.

In some aspects, the backup internal energy storage is a functional division of the normal internal energy storage controlled by the emergency operations mode as a virtual backup internal energy storage.

In some aspects, the geolocation is obtained by a global navigation satellite system (GNSS) sensor receiving signals from a plurality of satellites to infer the geolocation of the communications device through computations of the at least one processor, or by augmenting GNSS through signals from terrestrial cellular communication antennas, or by an inertial navigation system, or combinations thereof.

Thus, the communications device of the current disclosure enables the usage of two internal energy storages, one configured for normal operations, and one configured for emergency situations, where the latter restricts the operations to be performed only to emergency operations that consume less energy than the normal operations. The communications device of the current disclosure therefore enables users to have the security that, if their communications device runs out of power, the users may still have the option to use the alternative, backup internal energy storage for performing a number of operations that can help them in situations where usually they would need other resources, such as a power bank.

In one aspect, a method for providing backup energy to a communications device is provided. The method includes receiving, through a charging and discharging circuit by at least one processor, electric signals representing a state of charge of a normal internal energy storage of the communications device. The method also includes measuring the state of charge of the normal internal energy storage. The method also includes in response to determining that the state of charge of the normal internal energy storage has reached a predetermined level triggering a switching of an operations mode of the communications device from a normal operations mode to an emergency operations mode, and switching a power supply of the communications device from the normal internal energy storage to a backup internal energy storage configured to supply energy to the communications device only during emergency operations.

The method may further include, prior to switching from the normal operations mode to the emergency operations mode, switching off the communications device before automatically or manually rebooting in the emergency operations mode.

The method may further include, during the emergency operations mode, at least one of using a transceiver to perform emergency calls to pre-recorded emergency numbers, sending and receiving one or more text messages to the pre-recorded emergency numbers, using one or more cameras of the communications device for capturing and sending one or more photos or videos, obtaining a geolocation of the communications device, using an adjusted/reduced display illumination with reduced battery usage, reducing a refresh rate or frame rate when displaying images, and reducing a number of processor cores being used simultaneously to a minimum functional number.

The method may further include, during the emergency operations mode obtaining a geolocation of the communications device, and attaching the geolocation to at least one of an emergency call, a text message, a photo, and a video.

The method may further include controlling the charging and discharging circuit to direct e charge from an external power source to firstly charge the backup internal energy storage and then, once the backup internal energy storage is charged, the normal internal energy storage.

In some aspects of the method, the normal internal energy storage or the backup internal energy storage is a rechargeable battery, where the rechargeable battery is a lithium-ion polymer battery, a nickel cadmium battery, a nickel metal hydride battery, a lithium-ion battery, a lithium polymer battery, or a lead acid battery. In some aspects of the method the backup internal energy storage is a functional division of the normal internal energy storage controlled by the emergency operations mode as a virtual backup internal energy storage, and where the method further includes adjusting an allocated power supply of the virtual backup internal energy storage through a software user interface of the communications device.

The method may further include choosing whether the switching from the normal operations mode to the emergency operations mode occurs while the communications device is still on, or manually or automatically after the communications device switches off.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure provides a communications device, a backup internal energy storage, and a method for providing backup energy to a communications device. In contrast with conventional communications devices, the communications device of the current disclosure comprises, apart from a normal internal energy storage (e.g., a phone battery), a supplemental, backup internal energy storage configured to power the communications device during emergencies. For example, if the communications device runs out of power in a situation where the user may not have a phone charger, an electrical outlet to connect the charger, or a charged power bank available, the user may still be able to use the communications device for emergency operations, such as for making emergency phone calls or sending messages to one or more emergency numbers, computing a geolocation of the communications device, taking pictures or video, and/or adding geolocation data to the calls, messages, pictures or video.

After a processor of the communications device receives a signal indicative of the state of charge of the normal internal energy storage and determines that the state of charge has gone below a predetermined level, then the processor switches an operations mode of the communications device from a normal operations mode to an emergency operations mode (e.g., by switching or adjusting the operating system of the communications device), consequently triggering the switching from the normal internal energy storage to the backup internal energy storage. Configuring the backup internal energy storage within the communications device thus provides the benefit of not requiring any further equipment in order to power the communications device, which can be beneficial especially during emergency situations where the communications device has run out of power.

Figure 1A:
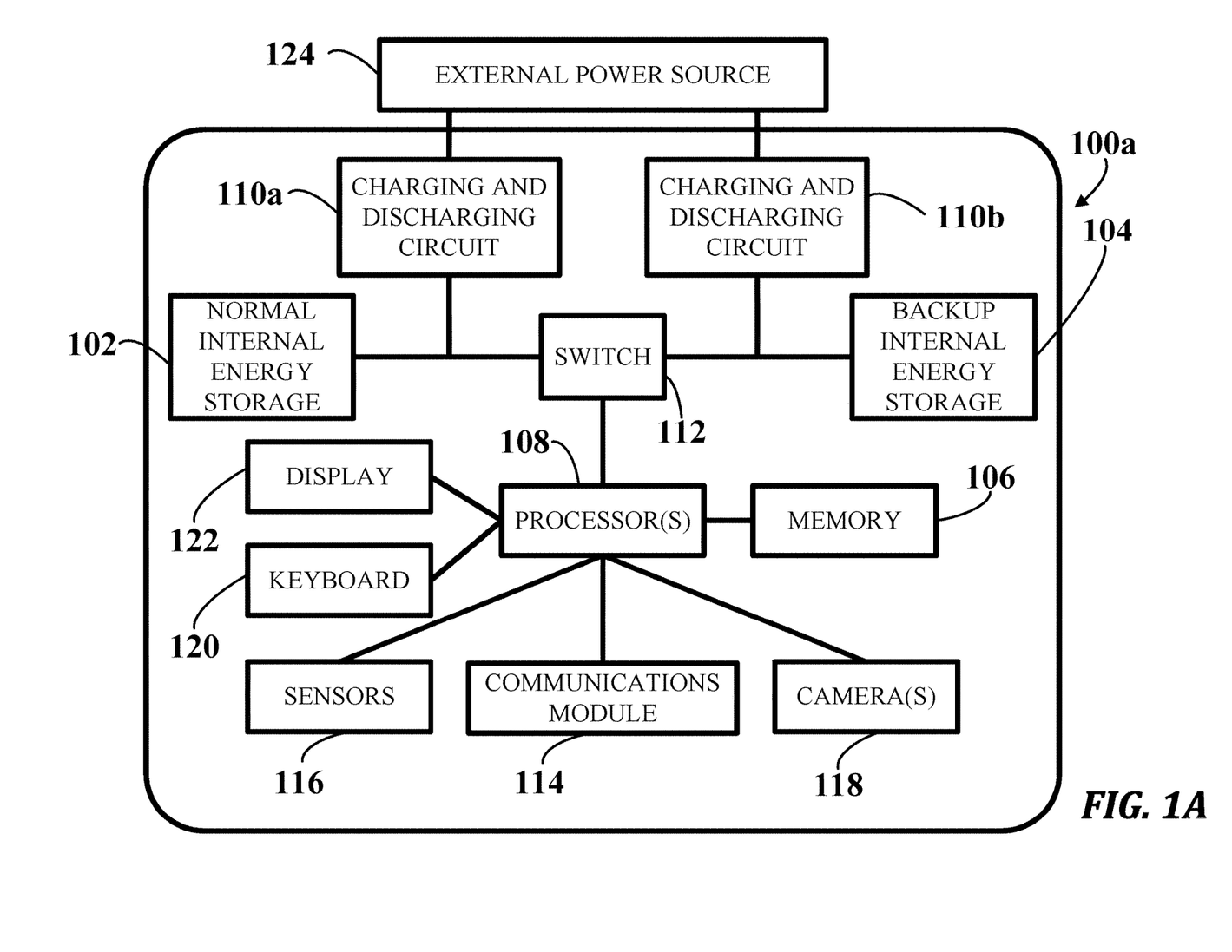
FIG. 1A-FIG. 1B show schematic representations including different non-limiting example embodiments of communications device 100a and communications device 100b of the current disclosure.
Figure 1B:
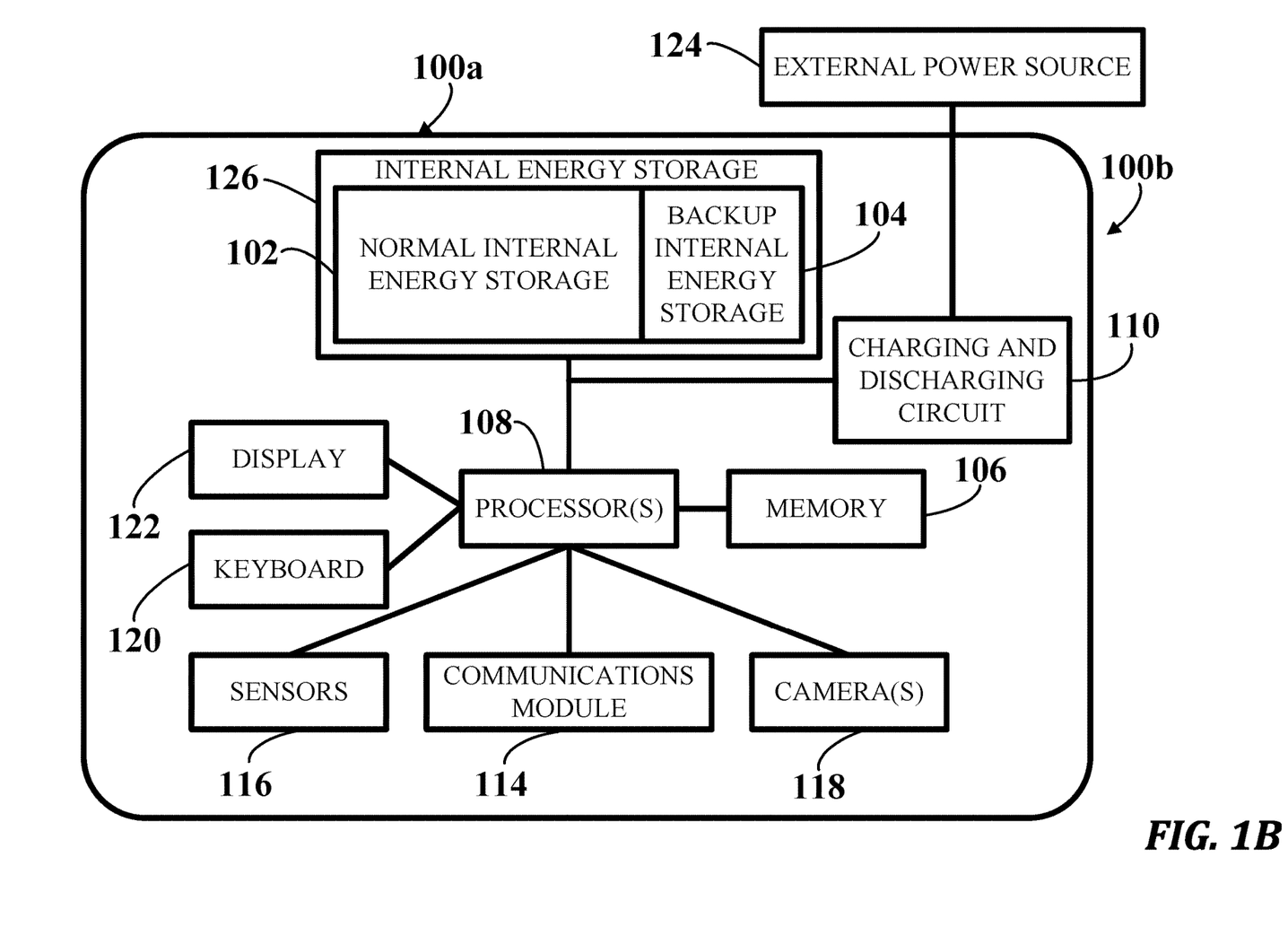

FIG. 1A-FIG. 1B show schematic representations including different non-limiting example embodiments of communications device 100a and communications device 100b of the current disclosure.

With reference to FIG. 1A, communications device 100a comprises a normal internal energy storage 102 configured to supply energy to the communications device 100a during normal operations. The communications device 100a further comprises a backup internal energy storage 104 configured to supply energy to the communications device 100a only for emergency operations. The communications device 100a is thus configured to use, depending on the state of charge of the normal internal energy storage 102, either the normal internal energy storage 102 or the backup internal energy storage 104, wherein both energy storages are placed and connected in an area within the communications device 100a. The communications device 100a further comprises at least one memory 106 including instructions for at least operating the communications device 100a and controlling the normal internal energy storage 102 through a normal operations mode and instructions for controlling the backup internal energy storage 104 through an emergency operations mode. The normal internal energy storage 102 or the backup internal energy storage 104 is a rechargeable battery, which may be a lithium-ion polymer battery, a nickel cadmium battery, a nickel metal hydride battery, a lithium-ion battery, a lithium polymer battery, lead acid battery, or any other type of rechargeable battery. Thus, in the current disclosure, the terms "battery" and internal energy storage will be used interchangeably to refer to rechargeable batteries that may be used by the communications device.

In the current disclosure, the term "normal" as used in the normal internal energy storage 102 refers to standard operations that a communications device can be used for in normal situations as contrasted to emergency situations, such as placing calls, sending text messages, taking high-resolution photo or video, running applications, browsing the Internet, and/or any other functionality provided by the communications device. The term "communications device" refers to any type of hardware capable of transmitting data, instructions, and information between itself (a sending device) and a receiving device. In some embodiments, the communications device is a mobile phone, such as a "smart" phone configured to connect to the Internet and enabling a plurality of interactions and downloading and using a plurality of applications. In other scenarios, the communications device may comprise any other communications devices capable of hosting at least two internal energy storages, such as personal digital assistants (PDAs), tablets, laptops, personal computers, and the like. Thus, the scope of the normal operations may also be linked to the type of communications device, where with the example of a smart phone, the normal operations may be more comprehensive and consume more power than "dumb" mobile phones. Further, the term "emergency operations" as used herein refers to using the communications device only for communicating with emergency contacts relevant information of the user in situations where the normal internal energy storage has run out of power. The operations permitted during emergency operations are typically operations that consume a reduced amount of energy and that are powered by the backup internal energy storage. In the current disclosure, the term "internal" as used to describe the normal internal energy storage 102 and backup internal energy storage 104 refers to the positioning of the energy storages within a communications device case rather than an external energy storage, such as a power bank or a connection through a charger to a power outlet. Thus, the energy storage devices of the current disclosure are configured in such a way that a user may not be required to carry an extra, external energy storage device to enable emergency operations.

The communications device 100a further includes at least one processor 108 configured to execute instructions in memory 106 to, amongst others, manage the communications device 100a functions and control the normal internal energy storage 102 and backup internal energy storage 104. The at least one processor 108 may be connected to a corresponding charging and discharging circuit 110a and charging and discharging circuit 110b linked respectively to the normal internal energy storage 102 and backup internal energy storage 104. When a state of charge of the normal internal energy storage 102 reaches a predetermined level, the at least one processor 108 switches the operations mode of the communications device 100a from a normal operations mode to an emergency operations mode (e.g., by switching or adjusting the operating system of the communications device to only allow emergency operations), and triggers the switching from consuming power from the normal internal energy storage 102 to consuming power from the backup internal energy storage 104.

In some embodiments, the at least one processor 108, prior to switching the operations mode, switches off the communications device 100a before automatically or manually rebooting in the emergency operations mode and switching from the normal internal energy storage 102 to the backup internal energy storage 104. A manual reboot may performed, e.g. by pressing a key or button of the communications device when a user desires to use the communications device during an emergency situation. In some embodiments, the memory 106 further comprises instructions to enable choosing whether the switch from the normal operations mode to the emergency operations mode occurs while the communications device 100a is still on after the normal internal energy storage 102 runs out, or whether that switch is done manually or automatically after the communications device 100a switches off.

Rebooting the communications device thus triggers switching from the normal operations mode, through its corresponding operating system, to the emergency operations mode that provides reduced functionality. Switching the operations mode triggers a corresponding switch in the internal energy storage being used, from the normal internal energy storage to the backup internal energy storage. This may differ from conventional backup battery systems and methods, which may switch operations mode and corresponding internal storage based on triggers such as when dialing an emergency number, which might consume the backup internal energy storage even when the normal internal energy storage may still hold a charge; may switch the operations mode to "battery saver" mode that adjusts functionality while using the same internal energy storage; or may propose external solutions, such as requiring users to exchange the battery (if allowed by the communications device and battery design), or to charge the communications device, or to connect the communications device to an external power bank, amongst others.

Switching the operations mode by switching or adjusting the operating system to the emergency operations mode after the normal internal energy storage runs out serves the purpose of saving charge by triggering reduced functionalities (e.g., allowing only low-power functions) to support the lower charge that may be allocated to the backup internal energy storage. Such reduced functionalities may comprise, for example, performing only emergency call to pre-recorded emergency numbers; or sending and receiving text message to the pre-recorded emergency numbers; or using one or more cameras of the communications device for capturing and sending photo or video; or obtaining a geolocation of the communications device; or a combination thereof. The emergency operations mode may further enable using an adjusted/reduced display illumination with reduced battery usage and/or may reduce a refresh rates and/or frame rate when displaying images. Meanwhile, all other battery consuming aspects may be disabled, including, e.g., Bluetooth radio transmissions, Wi-Fi radio transmissions, calling or sending messages to non-emergency numbers, processing voice commands, and/or providing multi-touch interface capabilities (which may be reduced to single touch capabilities). In some embodiments, the emergency operations mode reduces a number of processor cores being used simultaneously, such as to a minimum functional number, to support energy-saving purposes. For illustration purposes, using existing operating systems in the market as examples, the operations mode may be viewed as, e.g., an iOS™ emergency operations mode or an Android™ operating system emergency operations mode, which may include only reduced functionality.

The communications device 100a further comprises a switch 112 configured to enable the switching from the normal internal energy storage 102 to the backup internal energy storage 104. The switch 112 can be an electromechanical switch including one or more sets of movable electrical contacts connected to the charging and discharging circuit 110a and the charging and discharging circuit 110b to enable or disable, depending on their closed or open state, the passage of current from either of the normal internal energy storage 102 or backup internal energy storage 104 to power the communications device 100a.

The communications device 100a further comprises a communications module 114 comprising at least cellular position transceivers, which may aid in providing data for computing the positioning of the communications device 100a for the purpose of, for example, collecting geolocation data during an emergency situation. The cellular position transceivers may receive and send wireless signals from antennas of a cellular positioning system in order to compute the positioning of the communications device 100a through methods such as time of arrival (ToA), angle of arrival (AoA) and angle of departure (AoD). In some embodiments, the communications device 100a may communicate to other computing devices (e.g., other communications devices, servers, etc.) through a wireless network. The network may include, for example, millimeter-wave (mmW) or combinations of mmW and sub 6 GHz communication systems, such as 5th generation wireless systems communication (5G). In some embodiments, the system may connect through wireless local area networking (Wi-Fi). In some embodiments, the communications device 100a may communicatively connect through 4th generation wireless systems communication (4G), may be supported by 4G communication systems, and/or may include other wired or wireless communication systems.

In some embodiments, the communications device 100a further comprises sensors 116 such as Inertia Measuring Units (IMUs), global navigation satellite systems (GNSS) sensors, accelerometers, gyroscopes, light sensor, haptic sensors, eye-tracking sensors, and microphones, amongst others. The IMU is configured to measure and report the velocity, acceleration, angular momentum, speed of translation, speed of rotation, and other data of the communications device 100a by using a combination of accelerometers and gyroscopes. Positioning data from the IMU may be used to complement positioning data from the positioning enabled through the accelerometers within the IMU may be configured to measure the acceleration of the interaction device, including the acceleration due to the Earth's gravitational field. In some embodiments, accelerometers within the IMU may include a tri-axial accelerometer that is capable of measuring acceleration in three orthogonal directions. In some embodiments, one, two, three, or more separate accelerometers may be included within the IMU. In some embodiments, additional accelerometers and gyroscopes may be included separate from the IMU.

The GNSS sensors are receivers with antennas that use a satellite-based navigation system with one or more networks of satellites to provide position, velocity and timing information of the communications device 100a. Positioning data from the IMU and GNSS sensors may be used to complement positioning data of the transceivers from the communications module 114, which may aid in providing a more accurate geolocation of the communications device 100a, such as by using Kalman filter algorithm computations. The light sensors, haptic sensors, eye-tracking sensors, and microphones may be used to capture input details from a user and his or her environment.

The communications device 100a may further comprise a camera 118 configured to capture photos and/or videos, which may be sent, for example, during an emergency for helping to locate a user of the communications device 100a. In some embodiments, the at least one processor 108 is further configured to enable attaching the geolocation to any of the emergency calls, messages, photos, or videos.

The communications device 100a may further comprise a keyboard 120 and a display 122. The keyboard 120 may enable inputting texts or client commands through the communications device 100a for execution by the at least one processor 108, and the display 122 may enable viewing content and selecting options through appropriate graphical user interfaces (GUIs). The display 122 may also be a touch-sensitive display, and the communications device 100a may not include a separate keyboard 120.

The memory 106 may be implemented as computing software and hardware adapted to store application program instructions that, when executed by the at least one processor 108, trigger a plurality of operations of the communications device 100a. The memory 106 stores and manages the normal operations mode and an emergency operations mode that enable the management of the communications device 100a based on the energy storage being used, which may be run by the at least one processor 108 as part of the operating system of the communications device 100a. The memory 106 and processor 108 may together provide a battery management system (BMS) with algorithms configured to measure a plurality of parameters (e.g., temperature, voltage, state of charge, state of health, etc.) of the normal internal energy storage 102 and backup internal energy storage 104 for users to be able to monitor them. The BMS may further utilize a battery protection circuit to protect the normal internal energy storage 102 and backup internal energy storage 104 from operating outside a safe operating area, which is the voltage and current over which the normal internal energy storage 102 and backup internal energy storage 104 can operate without suffering damage. The memory 106 may be of any suitable type capable of storing information accessible by the at least one processor 108, including a computer-readable medium, or other medium that stores data that may be read with the aid of an electronic device, such as a hard-drive, memory card, flash drive, ROM, RAM, DVD or other optical disks, as well as other write-capable and read-only memories. The memory 106 may include temporary storage in addition to persistent storage.

The at least one processor 108 may be implemented as computing hardware and software configured to process instructions in memory 106, such as for managing the communications device 100a functions and control the normal internal energy storage 102 and backup internal energy storage 104. The at least one processor 108 may be implemented as a system on a chip (SoC) processor designed to support applications in a mobile operating system. The at least one processor 108 may thus provide an operating environment that provides all system capabilities to support the applications of the communications device 100a, including memory management, graphics, processing, multimedia decoding, battery management, receiving user input data and/or imaging data to generate user interaction data, providing server requests, receiving server responses, and/or provide user interaction data, receive and process location, position, or other data from sensors, from the communications module 114, or from combinations thereof. The at least one processor 108 may also be capable of implementing analog or digital signal processing algorithms such as raw data reduction or filtering. In some embodiments, the at least one processor 108 implements the BMS stored in memory 106 by executing algorithms configured to measure a plurality of parameters (e.g., temperature, voltage, state of charge, state of health, etc.) of the normal internal energy storage 102 and the backup internal energy storage 104 for users to be able to monitor them. The at least one processor 108 may comprise a plurality of cores depending on the processing power provided by the communications device, as determined by the manufacturer. Instructions may be executed directly (e.g., machine code), or indirectly (e.g., scripts) by the at least one processor 108. The instructions may be stored in object code format for direct processing by the at least one processor 108, or in any other computer language including scripts or collections of independent source code modules that may be interpreted on demand or compiled in advance. Data may be retrieved, stored, or modified by the at least one processor 108 in accordance with the instructions. Data may, for example, be stored in computer registers, in a relational database as a table having a plurality of different fields and records, XML documents, or flat files. The data may also be formatted in any computer-readable format.

In some embodiments, when charging the communications device 100a, the at least one processor 108 controls the charging and discharging circuit 110b to direct the charge from an external power source 124 to firstly charge the backup internal energy storage 104 and then, once the backup internal energy storage 104 is charged, controls the charging and discharging circuit 110a to direct the charge from the external power source 124 to the normal internal energy storage 102. In this way, the backup internal energy storage 104 has higher probabilities of being charged in case of a power outage and the communications device 100a is ensured to have enough charge to perform at least emergency operations.

With reference to FIG. 1B, a communications device 100b may comprise the same elements as FIG. 1A, e.g., a normal internal energy storage 102, a backup internal energy storage 104, at least one memory 106 and processor 108, a communications module 114, one or more sensors 116, and one or more cameras 118 providing the same functions as in FIG. 1A. Likewise, the communications device 100b may be connected to an external power source 124 as illustrated in FIG. 1A. However, in FIG. 1B, the normal internal energy storage 102 and backup internal energy storage 104 are a functional division of a single internal energy storage 126, which are controlled by the normal operations mode and the emergency operations mode in memory 106. Such an implementation may be achieved by a corresponding algorithm that defines a specific percentage of the total energy supply of the internal energy storage 126 to be allocated to the normal internal energy storage 102 with the remaining percentage to be allocated to the backup internal energy storage 104. Once a state of charge of the normal internal energy storage 102 portion of the internal energy storage 126 goes below a specific level, then the at least one processor 108 may proceed to switch the energy supply to the backup internal energy storage 104. In some embodiments, the memory 106 further comprises instructions to enable adjusting the allocated power supply of the internal energy storage 126 through a software graphical user interface (GUI) of the communications device accessible through the keyboard 120 and display 122. For example, parents may allocate a larger amount of energy supply to the backup internal energy storage 104 for their kids' mobile device, so that the kids do not use up all of the power of the mobile devices, giving them the option to still use the backup internal energy storage 104 but only for the limited, emergency operations.

Figure 2A:
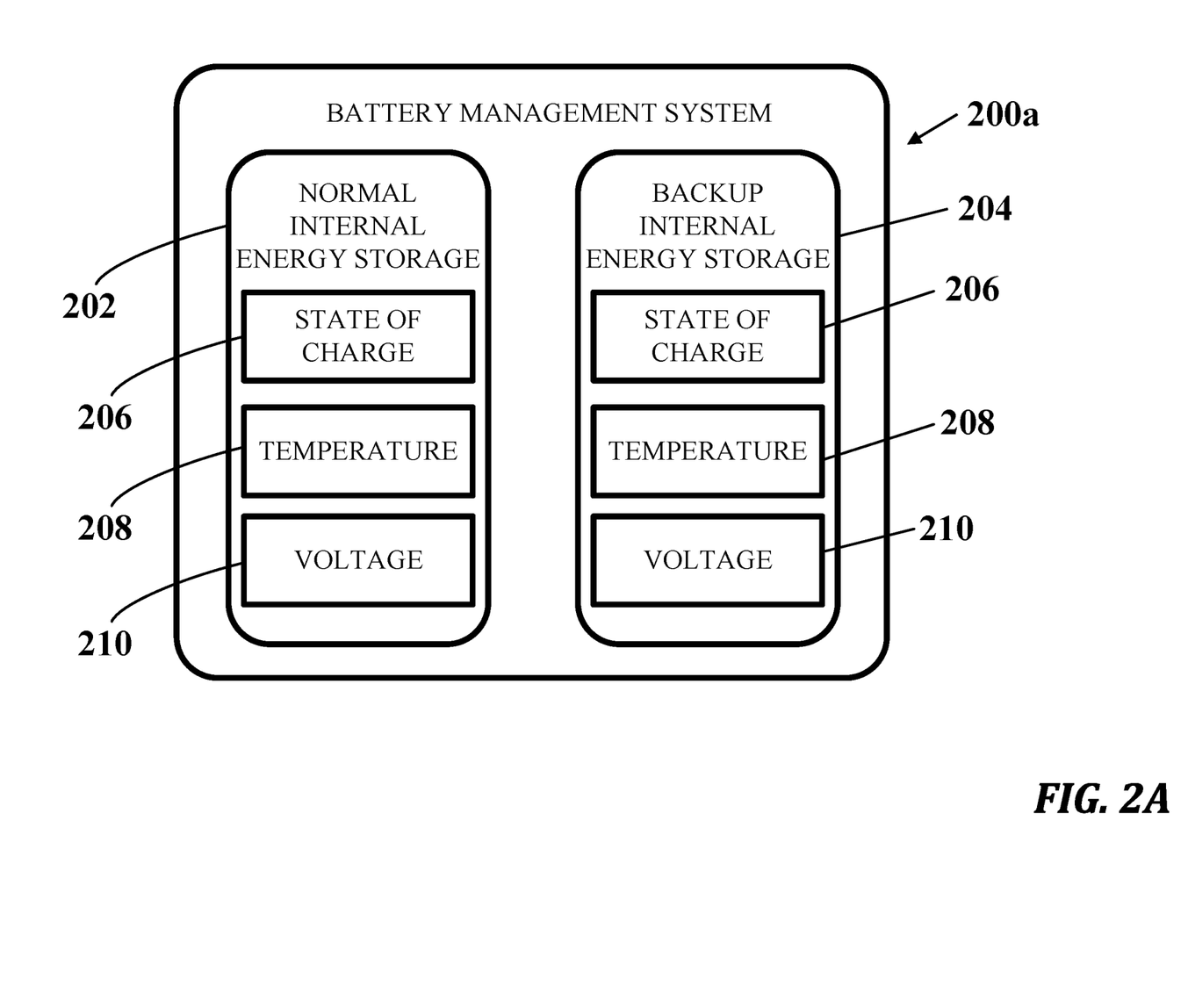
FIG. 2A-FIG. 2B show schematic representations including different embodiments of a battery management system 200a and a battery management system 200b of the current disclosure.
Figure 2B:
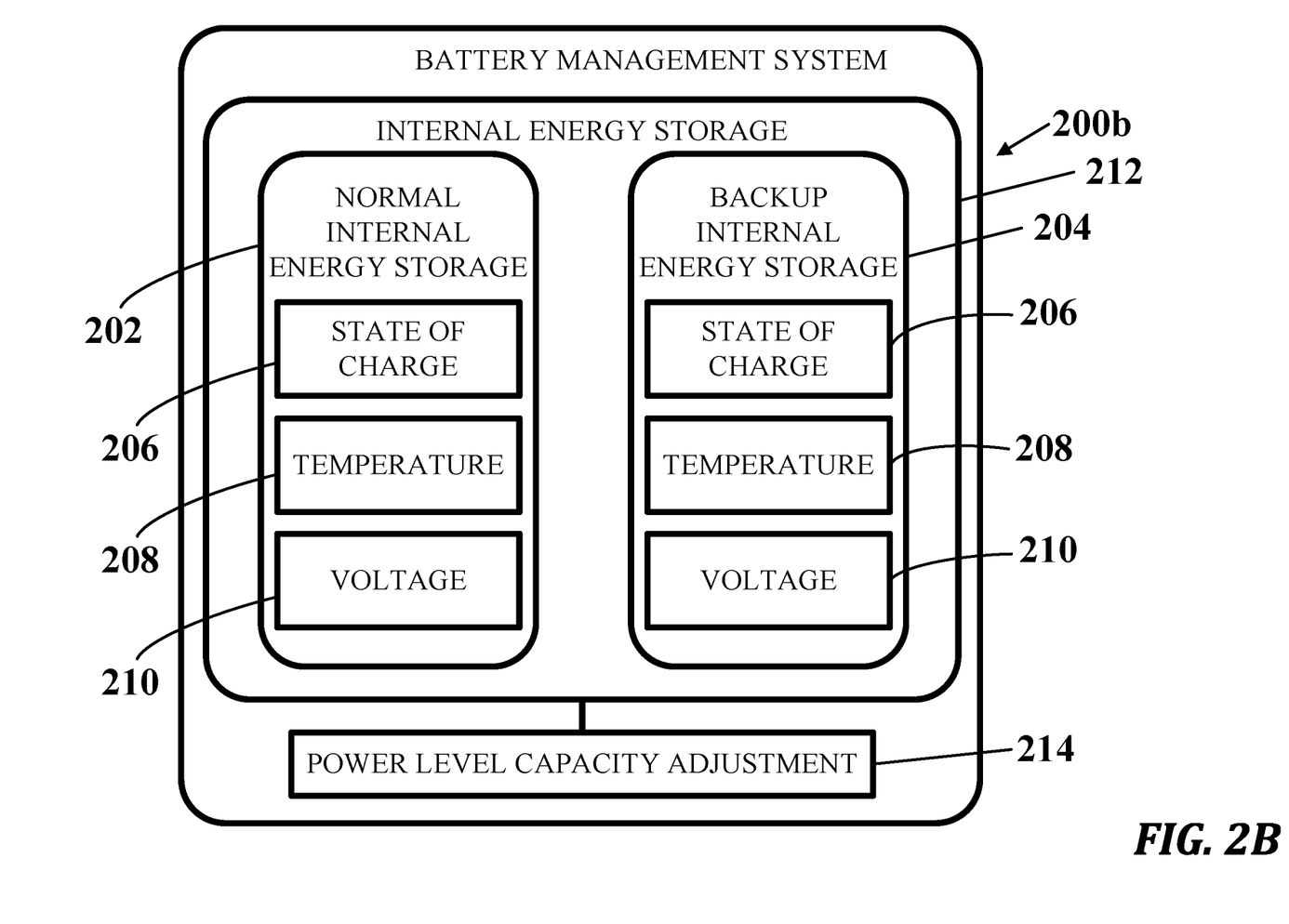

FIG. 2A-FIG. 2B show schematic representations including different embodiments of a battery management system 200a and a battery management system 200b of the current disclosure. The battery management system 200a and battery management system 200b may be stored in memory of the communications device and may be executed by the at least one processor to enable managing both a normal internal energy storage 202 and backup internal energy storage 204.

With reference to FIG. 2A, the battery management system 200a uses a plurality of sensors (e.g., temperature, voltage, current, harmonics and frequency sensors) to determine a state of charge 206 (SOC), temperature 208 and voltage 210, both for the normal internal energy storage 202 and backup backup internal energy storage 204, and communicates the information to the at least one processor to display said information in the display of the communications device. The SoC refers to the level of charge of the internal energy storages relative to their capacity, and is measured in percentage points, whereby 0% represents the energy storage being empty and 100% the energy storage being full.

The battery management system 200a may utilize a battery protection circuit to protect the normal internal energy storage 202 and backup internal energy storage 204 from operating outside a safe operating area, which is the voltage and current over which energy storages can operate without suffering damage. This may be especially important for certain types of batteries, such as for Lithium-Ion batteries, which, if overcharged, may be prone to damage and creating safety hazards, including fire danger, and may also be prone to reducing the battery's lifetime if over-discharged. The battery protection circuit may be an integrated circuit (IC), e.g., a metal-oxide-semiconductor field-effect transistor (MOSFET) which can be configured for switching lithium cells in and out of circuit. The MOSFET may comprise a charging circuit that may turn off if the voltage is too high during charging. Similarly, the MOSFET may comprise a discharging circuit, so that if the battery is discharging too quickly, or the cell voltage is going too low, then the MOSFET may turn off the discharge circuit and prevent further discharge. The battery protection circuit may be directly connected as a part of the internal energy storages (e.g., as an IC installed on the batteries), or may be a separate circuit connected to the batteries.

With reference to FIG. 2B, the battery management system 200b manages both the normal internal energy storage 202 and backup internal energy storage 204, as in FIG. 2A, with the difference that the normal internal energy storage 202 and backup internal energy storage 204 are functional divisions of a single internal energy storage 212. Such a functional division may be achieved by configuring the battery to allocate a portion of the power supply for normal operations and the remaining portion of the power supply for emergency operations. In some embodiments, the division may be a logical division of a percentage of an overall power available from the internal energy storage 212. In some embodiments, the division may be a physical division of subcomponents of the internal energy storage 212 (e.g., a first set of cells of the internal energy storage 212 allocated to the normal internal energy storage 202, and a second set of cells of the internal energy storage 212 allocated to the backup internal energy storage 204).

Further in FIG. 2B, the battery management system 200b enables a power level capacity adjustment 214 of the internal energy storage 212 through a GUI accessible from the display of the communications device via a configuration settings option of the communications device. Such a power level capacity adjustment 214 setting enables configuring the internal energy storage 212 such that the normal internal energy storage 202 gets a specific charge percentage from the total charge of the internal energy storage 212 allocated to the normal internal energy storage 202 and the remaining charge to be allocated to the backup internal energy storage 204. On a main screen of the communications device, the SoC may be displayed relative to the specific internal energy storage being used.

For example, a user may use the power level capacity adjustment 214 setting to configure the internal energy storage 212 such that the normal internal energy storage 202 gets 90% of the charge of the internal energy storage 212 allocated, while the backup internal energy storage 204 gets the remaining 10% of the charge of the internal energy storage 212 allocated. In this example, on the main screen of the communications device, when using the normal internal energy storage 202, the relative SoC may be displayed as 100% despite the actual SoC associated to the total charge of the internal energy storage being 90% allocated to the normal internal energy storage 202. Likewise, on the main screen of the communications device, when using the backup internal energy storage 204, the relative SOC may be displayed as 100% despite the actual SoC relative to the total charge of the internal energy storage being 10% allocated to the backup internal energy storage 204.

Figure 3:
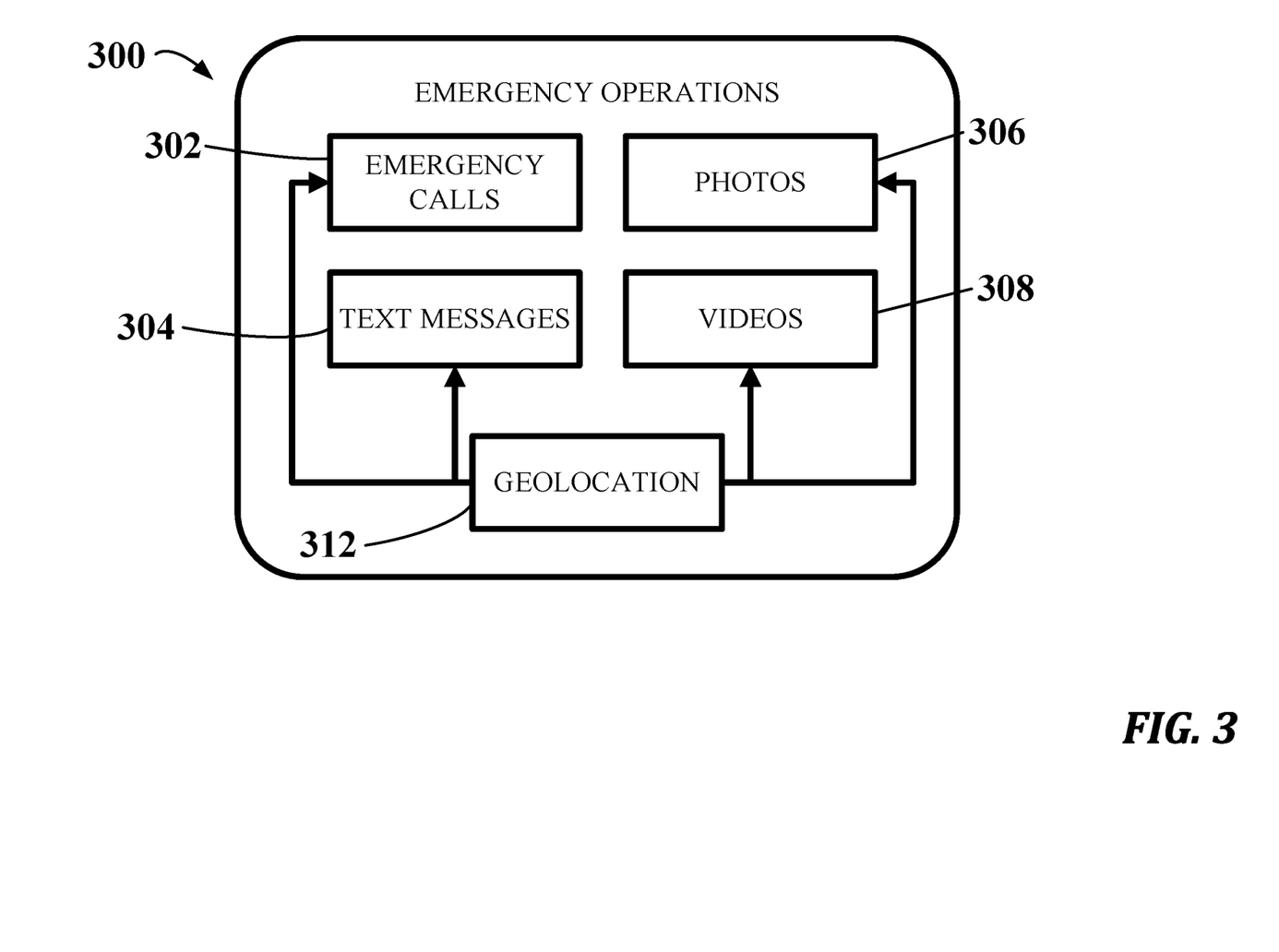
FIG. 3 shows emergency operations 300 enabled by a communications device of the current disclosure, according to an embodiment.

FIG. 3 shows emergency operations 300 enabled by a communications device of the current disclosure, according to an embodiment.

The emergency operations 300 include performing emergency calls 302 to pre-recorded emergency numbers; or sending and receiving text messages 304 to the pre-recorded emergency numbers; or using one or more cameras of the communications device for capturing and sending photos 306 or videos 308; or obtaining a geolocation 312 of the communications device; or a combination thereof. In some embodiments, the at least one processor of the communications device is further configured to enable attaching the geolocation 312 to any of the emergency calls 302, text messages 304, photos 306 or videos 308. The pre-recorded emergency numbers refer to phone numbers that have been established by a user as numbers that can be reached in case of emergencies that render the normal operations to be disabled, and may be one or more of a private emergency number (e.g., from a close relative) or a public emergency number (e.g., 911). In some embodiments, at least some of the pre-recorded emergency numbers (such as public emergency numbers) may be configured by default without being established by a user.

In some embodiments, the emergency operations 300 may further enable using an adjusted/reduced display illumination with reduced battery usage and may reduce the refresh rates and frame rate when displaying images. Meanwhile, all other battery consuming aspects may be disabled, including, e.g., Bluetooth, Wi-Fi, calling or sending messages to non-emergency numbers, voice commands, or display multi-touch capabilities, which may be reduced to single touch capabilities. In some embodiments, the emergency operations mode further enables reducing the number of processor cores being used simultaneously to a minimum functional number, e.g., to only one processor core to support energy-saving purposes.

Figure 4:
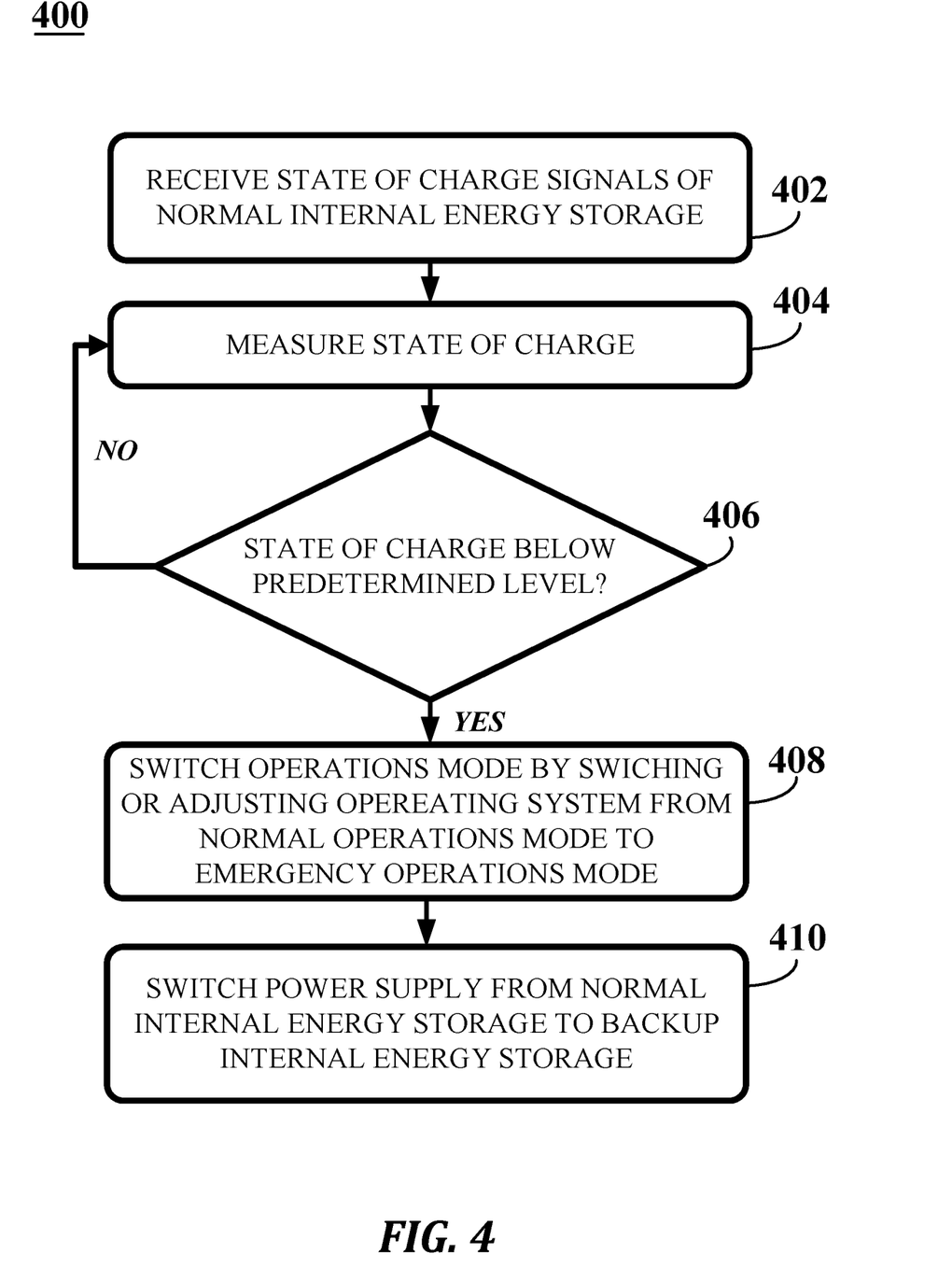
FIG. 4 depicts a method 400 for providing backup energy to a communications device, performed by at least one processor of the communications device executing instructions in memory.

FIG. 4 depicts a method 400 for providing backup energy to a communications device, performed by at least one processor of the communications device executing instructions in memory.

The method 400 begins in block 402 by receiving through a charging and discharging circuit by the at least one processor, signals from the normal internal energy storage representing the SoC of the normal internal energy storage. The method 400 continues in block 404 by measuring the SoC of the normal internal energy storage. For example, the at least one processor may receive electric analog signals and may convert them to digital signals to measure the SoC of the normal internal energy storage. In decision block 406, the method 400 proceeds by checking if the SoC of the normal internal energy storage reaches a predetermined level. In a positive case, the method proceeds in block 408 by switching the operations mode of the communications device from a normal operations mode to an emergency operations mode (e.g., by switching or adjusting the operating system of the communications device). In a negative case where the state of charge of the normal internal energy storage does not reach the predetermined level, the method 400 proceeds by continuing to measure the state of charge in block 404. In block 410, the method 400 proceeds by triggering the switching from the normal internal energy storage to the backup internal energy storage.

In other embodiments, the method 400 further comprises, prior to switching the operations mode, switching off the communications device before automatically or manually rebooting in emergency operations mode and triggering the corresponding switching from the normal internal energy storage to the backup internal energy storage. Such a manual reboot may performed, e.g. by pressing a key of the communications device when a user desires to use the communications device during an emergency situation. In yet further embodiments, the method further enables selecting whether the switch from operations mode occurs while the communications device is still on after the normal internal energy storage runs off, or manually or automatically after the communications device switches off.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A communications device comprising:
    an internal energy storage comprising:
        a normal internal energy storage configured to supply energy to the communications device during normal operations; and
        a backup internal energy storage configured to supply energy to the communications device during emergency operations, wherein the backup internal energy storage is a functional division of the internal energy storage;
    at least one processor connected to a charging and discharging circuit linked to the normal internal energy storage and the backup internal energy storage; and
    at least one memory having stored thereon instructions that, in response to execution by the at least one processor, cause the processor to perform actions for at least operating the communications device, controlling the normal internal energy storage through a normal operations mode and for controlling the backup internal energy storage through an emergency operations mode, wherein the actions comprise:
        managing functionality of the communications device and controlling the normal internal energy storage and the backup internal energy storage;
        adjusting a portion of the internal energy storage allocated to the backup internal energy storage instead of the normal internal energy storage through a software user interface of the communications device accessible through a corresponding display and graphical user interface (GUI); and
        in response to detecting that a state of charge of the normal internal energy storage has reached a predetermined level:
            causing the communications device to switch from the normal operations mode to the emergency operations mode; and
            causing the communications device to switch from consuming power from the normal internal energy storage to consuming power from the backup internal energy storage.

2. The communications device of claim 1, wherein the actions further comprise, prior to causing the communications device to switch from the normal operations mode to the emergency operations mode, causing the communications device to switch off before an automatic or manual reboot.

3. The communications device of claim 1, wherein the actions further comprise:
    providing an interface for choosing whether the communications device is automatically caused to switch off before switching from the normal operations mode to the emergency operations mode.

4. The communications device of claim 1, wherein said switching from the normal internal energy storage to the backup internal energy storage is performed by a switch connected to the at least one processor.

5. The communications device of claim 1, wherein the actions further comprise, during the emergency operations mode, at least one of:
    using at least one transceiver of the communications device to perform emergency call to pre-recorded emergency numbers;
    sending and receiving text message to the pre-recorded emergency numbers;
    using one or more cameras of the communications device for capturing and sending photo or video; and
    obtaining a geolocation of the communications device.

6. The communications device of claim 1, wherein the actions further comprise, during the emergency operations mode:
    obtaining a geolocation of the communications device; and
    attaching the geolocation to at least one of an emergency call, a text message, a photo, and a video.

7. The communications device of claim 6, wherein the geolocation is obtained by a global navigation satellite system (GNSS) sensor receiving signals from a plurality of satellites to infer the geolocation of the communications device through computations of the at least one processor, or by augmenting GNSS through signals from terrestrial cellular communication antennas, or by an inertial navigation system, or combinations thereof.

8. The communications device of claim 1, wherein the actions further comprise, during the emergency operations mode, at least one of:
    enabling one or more cameras of the communications device to capture photo and video in a low resolution;
    enabling using an adjusted or reduced display illumination with reduced battery usage;
    reducing a refresh rate when displaying images;
    reducing a frame rate when displaying video; and
    reducing a number of processor cores being used simultaneously to a minimum functional number.

9. The communications device of claim 1, wherein when charging the communications device, the at least one processor controls the charging and discharging circuit to direct charge from an external power source to firstly charge the backup internal energy storage and then, once the backup internal energy storage is charged, the normal internal energy storage.

10. The communications device of claim 1, wherein at least one of the normal internal energy storage and the backup internal energy storage is a rechargeable battery, wherein the rechargeable battery is a lithium-ion polymer battery, a nickel cadmium battery, a nickel metal hydride battery, a lithium-ion battery, a lithium polymer battery, or a lead acid battery.

11. The communications device of claim 1, wherein the functional division of the internal energy storage is a logical division of a percentage of an overall power available from the internal energy storage.

12. The communications device of claim 1, wherein the functional division of the internal energy storage is a physical division of subcomponents of the internal energy storage.

13. A method for providing backup energy to a communications device, wherein the communications device includes an internal energy storage comprising a normal internal energy storage and a backup internal energy storage that is a functional division of the internal energy storage and is configured to supply energy to the communications device only during emergency operations, the method comprising:

adjusting a portion of the internal energy storage allocated to the backup internal energy storage instead of the normal internal energy storage through a software user interface of the communications device accessible through a corresponding display and graphical user interface (GUI);

receiving, through a charging and discharging circuit by at least one processor, electric signals representing a state of charge of the normal internal energy storage;

measuring the state of charge of the normal internal energy storage; and in response to determining that the state of charge of the normal internal energy storage has reached a predetermined level:

triggering a switching of an operations mode of the communications device from a normal operations mode to an emergency operations mode; and     switching a power supply of the communications device from the normal internal energy storage to the backup internal energy storage.

14. The method of claim 13, further comprising:

prior to switching from the normal operations mode to the emergency operations mode, switching off the communications device before automatically or manually rebooting in the emergency operations mode.

15. The method of claim 14, further comprising choosing whether the switching from the normal operations mode to the emergency operations mode occurs while the communications device is still on, or manually or automatically after the communications device switches off.

16. The method of claim 13, further comprising, during the emergency operations mode, at least one of:

using a transceiver to perform emergency calls to pre-recorded emergency numbers;

sending and receiving one or more text messages to the pre-recorded emergency numbers;

using one or more cameras of the communications device for capturing and sending one or more photos or videos;

obtaining a geolocation of the communications device;

using an adjusted/reduced display illumination with reduced battery usage;

reducing a refresh rate or frame rate when displaying images; and reducing a number of processor cores being used simultaneously to a minimum functional number.

17. The method of claim 13, further comprising, during the emergency operations mode:

obtaining a geolocation of the communications device; and attaching the geolocation to at least one of an emergency call, a text message, a photo, and a video.

18. The method of claim 13, further comprising controlling the charging and discharging circuit to direct charge from an external power source to firstly charge the backup internal energy storage and then, once the backup internal energy storage is charged, the normal internal energy storage.

19. The method of claim 13, wherein the normal internal energy storage or the backup internal energy storage is a rechargeable battery, wherein the rechargeable battery is a lithium-ion polymer battery, a nickel cadmium battery, a nickel metal hydride battery, a lithium-ion battery, a lithium polymer battery, or a lead acid battery.

20. The method of claim 13, wherein adjusting a portion of the internal energy storage allocated to the backup internal energy storage instead of the normal internal energy storage comprises adjusting a percentage of an overall power available from the internal energy storage allocated to the backup internal energy storage or adjusting a number of physical subcomponents of the internal energy storage allocated to the backup internal energy storage.

\* \* \* \* \*